(12) United States Patent
Fujiwara et al.

(10) Patent No.: US 9,914,346 B1
(45) Date of Patent: Mar. 13, 2018

(54) POWER EQUIPMENT ARRAGEMENT FOR A HYBRID VEHICLE

(71) Applicant: HONDA MOTOR CO., LTD., Tokyo (JP)

(72) Inventors: Hidetomo Fujiwara, Saitama (JP); Tatsuro Horie, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/679,272

(22) Filed: Aug. 17, 2017

(30) Foreign Application Priority Data

Aug. 24, 2016 (JP) .................................. 2016-164012

(51) Int. Cl.
*B60K 1/04* (2006.01)
*B62D 25/20* (2006.01)
(52) U.S. Cl.
CPC ............... *B60K 1/04* (2013.01); *B62D 25/20* (2013.01); *B60K 2001/0422* (2013.01); *B60K 2001/0438* (2013.01)
(58) Field of Classification Search
CPC .. B60K 1/04; B60K 6/40; B60K 6/405; B60S 5/06
See application file for complete search history.

(56) References Cited

U.S. PATENT DOCUMENTS

| 9,321,338 | B2* | 4/2016 | Naruke | B60K 1/04 |
| 2009/0183935 | A1* | 7/2009 | Tsuchiya | B60K 1/04 |
| | | | | 180/68.1 |
| 2014/0246259 | A1* | 9/2014 | Yamamura | B60K 1/04 |
| | | | | 180/68.5 |

FOREIGN PATENT DOCUMENTS

JP    2015-074406 A    4/2015

* cited by examiner

*Primary Examiner* — John D Walters
*Assistant Examiner* — James J Triggs
(74) *Attorney, Agent, or Firm* — Paratus Law Group, PLLC

(57) ABSTRACT

A vehicle includes: a power equipment; a floor panel having a recessed power equipment containing portion that houses the power equipment; and a frame member that suspends and holds the power equipment, wherein the frame member is fixed to the floor panel through a holding member so that a part of the power equipment protrudes from the floor panel, the holding member has an upper end surface, a lower end surface, and a vertical wall that connects the upper end surface and the lower end surface to each other. The frame member is fastened to the upper end surface of the holding member, and the floor panel is fastened to the lower end surface of the holding member.

7 Claims, 6 Drawing Sheets

POWER EQUIPMENT ARRAGEMENT FOR A HYBRID VEHICLE

CROSS-REFERENCE TO RELATED APPLICATION(S)

This application claims priority from Japanese Patent Application No. 2016-164012 filed on Aug. 24, 2016, the entire contents of which are incorporated herein by reference.

TECHNICAL FIELD

The present invention relates to a vehicle mounted with a power equipment such as a vehicle driving battery.

BACKGROUND ART

A battery (battery module) is mounted on a hybrid vehicle which travels using an engine and a motor in combination, an electric vehicle which travels only using a motor, and the like to store electric power and supply the electric power to the motor.

In order to sufficiently obtain a space for an occupant in a passenger compartment, it is proposed to dispose the battery on a floor panel, for example, a lower part of a seat in the passenger compartment. A vehicle is disclosed in Patent Literature 1 in which a battery is disposed on a floor panel.

PRIOR ART LITERATURE

Patent literature

[Patent Literature 1]: JPS-A-2015-74406

SUMMARY OF THE INVENTION

Problem that the Invention is to Solve

However, when a power equipment such as a battery is disposed on the floor panel, if the power equipment is installed according to a floor surface, a seat position becomes accordingly higher, which hinders low-flooring. On the other hand, it is conceivable to provide a recessed power equipment containing portion in the floor panel and to house the power equipment in the recessed power equipment containing portion, but there is a problem that a waterproof line of the power equipment is lowered.

The present invention provides a vehicle capable of maintaining a waterproof line of a power equipment at a high position while achieving low-flooring.

Means for Solving the Problem

The present invention provides following aspects.

A first aspect is a vehicle (e.g., a vehicle 1 in embodiment) including:
a power equipment (e.g., a power equipment unit 20 in embodiment);
a floor panel (e.g., a floor panel 9 in embodiment) having a recessed power equipment containing portion (e.g., a power equipment unit containing portion 10 in embodiment) that houses the power equipment; and
a frame member (e.g., a frame member 33 in embodiment) that suspends and holds the power equipment, wherein the frame member is fixed to the floor panel through a holding member (e.g., a holding member 70 in embodiment) so that a part of the power equipment protrudes from the floor panel,
the holding member has an upper end surface (e.g., an upper end surface 71 in embodiment), a lower end surface (e.g., a lower end surface 72 in embodiment), and a vertical wall (e.g., a vertical wall 73 in embodiment) that connects the upper end surface and the lower end surface to each other,
the frame member is fastened to the upper end surface of the holding member, and
the floor panel is fastened to the lower end surface of the holding member.

A second aspect is the vehicle according to the first aspect, wherein
the holding member has substantially a U-shaped cross section that opens outward in a vehicle width direction.

A third aspect is the vehicle according to the second aspect, wherein
an air-conditioning duct a heater duct 13 in embodiment) is disposed in a U-shaped space (e.g., a U-shaped space 74 in embodiment) of the holding member.

A fourth aspect is the vehicle according to any one of the first to third aspects, wherein
the lower end surface of the holding member extends along the floor panel, and
the upper end surface of the holding member extends substantially horizontally.

A fifth aspect is the vehicle according to any one of the first to fourth aspects, wherein
a fastening point (e.g., a fastening point P1 or P2 in embodiment) between the upper end surface of the holding member and the frame member is disposed inward in a vehicle width direction from a fastening point (e.g., a fastening point P3 or P4 in embodiment) between the lower end surface of the holding member and the floor panel.

A sixth aspect is the vehicle according to any one of the first to fifth aspects, wherein
a fastening point (e.g., the fastening point P3 or P4 in embodiment) between the lower end surface of the holding member and the floor panel is disposed at an overlapping position in a plan view with a floor frame (e.g., a floor frame 11 in embodiment) extending in a front and rear direction on an inner side in a vehicle width direction of a side sill (e.g., a side sill 14 in embodiment).

A seventh aspect is the vehicle according to any one of the first to sixth aspects, wherein
the power equipment containing portion is provided below a seat (e.g., a front seat 5 in embodiment).

Advantage of the Invention

According to the first aspect, since the frame member is configured to suspend and hold the power equipment in the recessed power equipment containing portion and is fixed to the floor panel through the holding member, it is possible to maintain the part of the power equipment at a position higher than the floor surface, and to also maintain a waterproof line at a high position while achieving low-flooring.

Further, since the frame member is fixed to the floor panel through the holding member, the holding member can absorb deformation of a skeleton member of the vehicle at the time of a side collision. Moreover, the power equipment can also be protected by the vertical wall of the holding member at the time of the side collision.

According to the second aspect, since the holding member has substantially the U-shaped cross section, the holding member can be easily manufactured by press forming.

According to the third aspect, the holding member can protect the air-conditioning duct in the U-shaped space while holding the power equipment. That is, since the upper end surface of the holding member covers the upper side of the air-conditioning duct, it is possible to alleviate the impact in the vertical direction of the air-conditioning duct and to also alleviate noise from the air-conditioning duct.

Further, since the vertical wall of the holding member is interposed between the power equipment and the air-conditioning duct, a heat insulating effect can be expected between the power equipment and the air-conditioning duct.

According to the fourth aspect, the shape of the lower end surface of the holding member is adjusted according to the inclination of the floor panel, and thus the inclination of the floor surface can be adjusted by the holding member, whereby the power equipment can be held in parallel even when the floor surface is inclined.

According to the fifth aspect, since the fastening point between the upper end surface of the holding member and the frame member is located inward in the vehicle width direction from the fastening point between the lower end surface of the holding member and the floor panel, the length in the vehicle width direction can be lengthened by the holding member. Accordingly, the length of the frame member can be shortened, and thus the power equipment can be more firmly held by the frame member and the holding member.

According to the sixth aspect, since the fastening point between the lower end surface of the holding member and the floor panel is disposed at an overlapping position in a plan view with the floor frame extending in the front and rear direction on the inner side in the vehicle width direction of the side sill, the power equipment can be held more firmly.

According to the seventh aspect, the power equipment is installed under the seat, and thus a space for the occupant can be widely kept in the passenger compartment.

MODE FOR CARRYING OUT THE INVENTION

Figure 1:
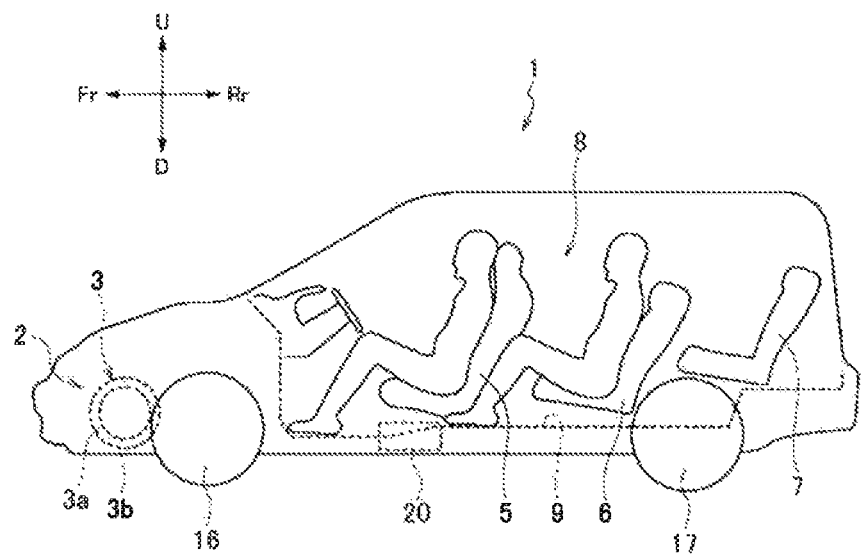
FIG. 1 is a schematic diagram illustrating a hybrid vehicle according to an embodiment of the present invention.

Hereinafter, one embodiment of the present invention will be described in detail with reference to the accompanying drawings. Incidentally, the drawings are viewed in directions indicated by reference numerals. In the following description, a front and rear side, a right and left side, and a vertical side follow directions in which a driver views. In the drawings, the front side of the vehicle is indicated by Fr, the rear side is indicated by Rr, the left side is indicated by L, and the right side is indicated by R, the upper side is indicated by U, and the lower side is indicated by D.

FIG. 1 is a schematic diagram illustrating a hybrid vehicle according to an embodiment of the present invention. The vehicle 1 is mounted with a power unit 3 in which an engine 3a and a motor generator 3b are installed in series in an engine room 2 at the front of the vehicle. For example, the motor generator 3b is a three-phase AC motor. The vehicle 1 is a hybrid vehicle which is driven by the engine 3a and/or the motor generator 3b, and is capable of recovering electric power from the motor generator 3b during vehicle deceleration and the like.

In the vehicle 1, a driving force of the engine 3a and the motor generator 3b is transmitted to a front wheel 16 which is a driving wheel. A rear wheel 17 is a driven wheel, in addition, when the driving force is transmitted from the front wheel 16 to the motor generator 3b during deceleration of the vehicle 1 and the like, the motor generator 3b functions as a generator to generate a so-called regenerative braking tierce so that kinetic energy of the vehicle 1 is recovered as electric energy. The recovered electric energy is charged in a battery 50 (see FIG. 2) through an electric power converter such as an inverter included in a high-voltage device to be described below.

At the rear side of the engine room 2, a passenger compartment 8 is provided in which a front seat 5, a middle seat 6, and a rear seat 7 are arranged.

A power equipment unit 20 connected with the power unit 3 through an electric power cable (not illustrated) is arranged on the lower side of the front seat 5 (a driver's seat and a front passenger's seat) in the passenger compartment 8.

Figure 2:
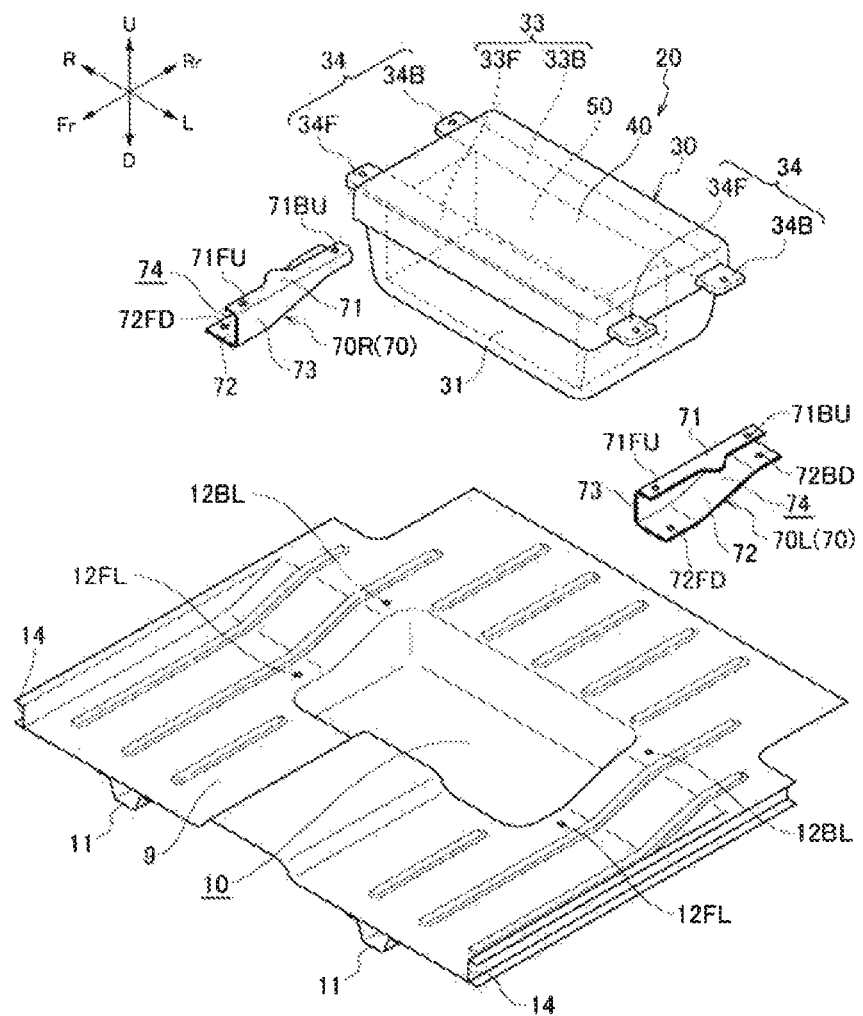
FIG. 2 is an exploded perspective view of a power equipment unit housed in a power equipment unit containing portion formed in a floor panel of the hybrid vehicle illustrated in FIG. 1.
Figure 3:
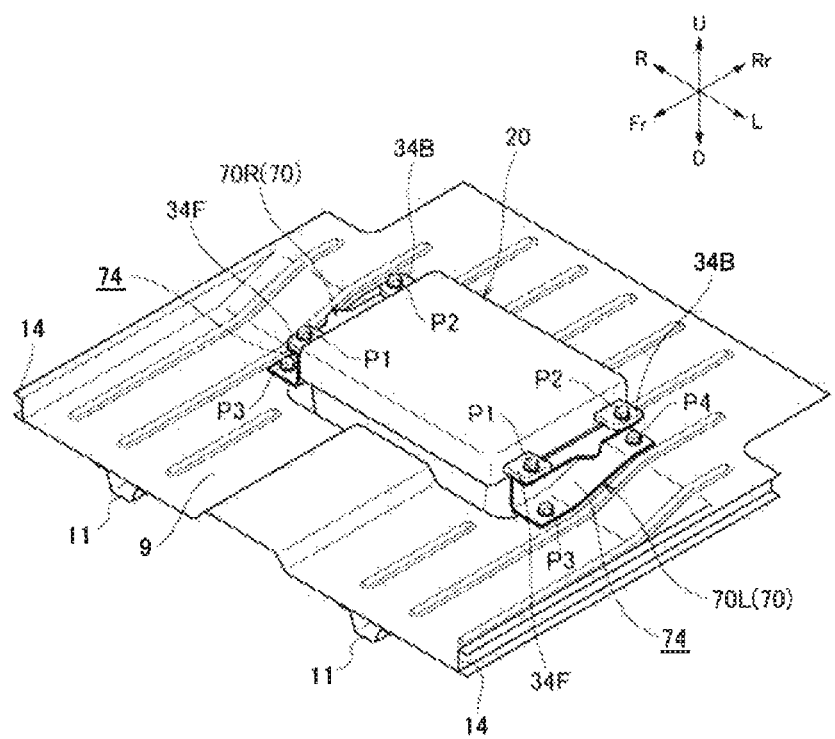
FIG. 3 is a perspective view illustrating a state in which the power equipment unit is housed in the power equipment unit containing portion formed in the floor panel of the hybrid vehicle illustrated in FIG. 1.

As illustrated in FIG. 2, a recessed power equipment unit containing portion 10 is provided below the front seat 5 of the floor panel 9, and a power equipment unit 20 is housed in the recessed power equipment unit containing portion 10. On a lower surface of the floor panel 9, a pair of floor frames 11 extending in the front and rear direction on the inner side in the vehicle width direction of a side sill 14 are disposed on both left and right sides of the power equipment unit containing portion 10 interposed therebetween. Although the floor panel 9 has an inclined plane that is inclined rearward and upward on both sides of the power equipment unit containing portion 10, a bottom of the power equipment unit containing portion 10 is a horizontal plane.

The power equipment unit 20 is a unit including the battery 50, a high-voltage device and a power distribution component (not illustrated) for controlling an electric power delivery of the battery 50, a main switch (not illustrated) for the battery 50, and a case 30 that houses these components.

The case 30 of the power equipment unit 20 includes a container-shaped case body 3 having a bottom and a lid member 40 which covers the upper portion of the case body 31, and is sealed from the outside by a seal member (not illustrated). The battery 50, the high voltage device, the power distribution component (high-voltage power distribution component) and the like are accommodated inside the case body 31. The case body 31 is shaped in a bottomed container which has an opening directed to the upper side of the vehicle 1. The interior thereof serves as an accommodating part 33 for accommodating the battery 50 and the like. The lid member 40 is a substantially plate-shaped member which blocks the opening of the case body 31.

Although not illustrated in detail, the battery 50 is provided in a state where a plurality of battery cells are bundled together. In addition, the high-voltage device is an electronic equipment including an inverter and a DC/DC converter.

Electronic equipment such as ECU is also provided in the high-voltage device. Due to the function of the high-voltage device, direct current is obtained from the battery 50, the direct current is converted into three-phase alternating current, the current is supplied to the motor generator 3b to drive it, and regenerative current from the motor generator 3b is converted into direct current, thereby enabling the battery 50 to be charged.

Legs 34 of the pair of front and rear frame members 33 for holding the battery 50, the high-voltage device, the power distribution component (high-voltage power distribution component), and the like extend from the case 30 of the power equipment unit 20 to left and right outsides of the case 30, and these legs 34 are fixed to the floor panel 9 through the holding members 70. The case 30 is suspended in the power equipment unit containing portion 10 formed in the floor panel 9 so that an upper part thereof i protrudes from the floor panel 9.

The holding member 70 is a plate-shaped member having substantially a U-shaped cross section in which an inner end of an Upper end surface 71 and an inner end of a lower end surface 72 are connected to each other by a vertical wall 73, and is formed by pressing a metal place.

Left and right front legs 34F of a front frame member 33F are fastened (fastening point P1) to a front upper fastening portion 71FU of the upper end surface 71 of the left holding member 70L and a front upper fastening portion 71FU of the upper end surface 71 of the right holding member 70R, respectively, and left and right rear legs 34B of a rear frame member 33B are fastened (fastening point P2) to a rear upper fastening portion 71BU of the upper end surface 71 of the left holding member 70L and a rear upper fastening portion 71BU of the upper end surface 71 of the right holding member 70R, respectively.

In addition, a front lower fastening portion 72FD of the lower end surface 72 of the left holding member 70L is fastened (fastening point P3) to a front fastening portion 12FL of the floor panel 9, and a rear lower fastening portion 72BD of the lower end surface 72 of the left holding member 70L is fastened (fastening point P4) to a rear fastening portion 12BL of the floor panel 9. Similarly, a front lower fastening portion 72FD of the lower end surface 72 of the right holding member 70R is fastened (fastening point P3) to the front fastening portion 12FL of the floor panel 9, and a rear lower fastening portion 72BD (not illustrated) of the lower end surface 72 of the right holding member 70R is fastened (fastening point P4 (not illustrated)) to the rear fastening portion 12BL of the floor panel 9. The front fastening portion 12FL and the rear fastening portion 12BL of the floor panel 9 are disposed at overlapping positions with the left and right floor frames 11 in a plan view.

Figure 6:
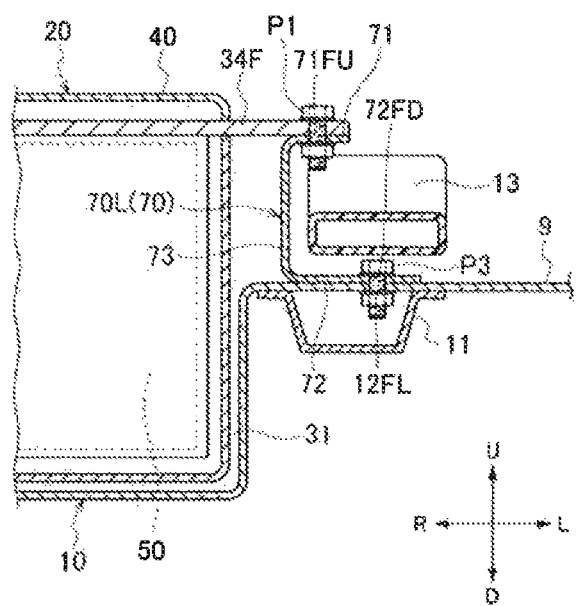
FIG. 6 is a sectional view taken along line A-A in FIG. 5.

As illustrated in FIG. 6, the fastening points P1 and P2 between the legs 34 (34F and 34B) of the frame members 33 (33F and 33B) and the upper end surfaces 71 of the holding members 70 (70L and 70R) are located inward in the vehicle width direction from the fastening points P3 and P4 between the lower end surfaces 72 of the holding members 70 (70L and 70R) and the floor panel 9, and a right-to-left width of the frame member 33 (33F or 33B) is shorter than an interval between the floor frames 11 (11L and 11R) in the vehicle width direction.

Figure 5:
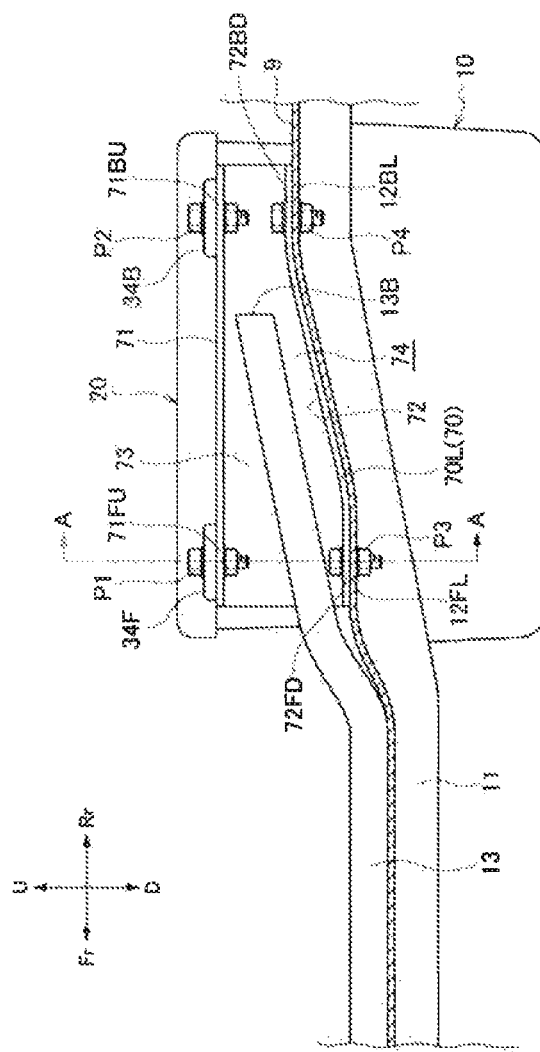
FIG. 5 is a side view of FIG. 4.

As illustrated in FIG. 5, the fastening points PI and P2 between the legs 34 (34F and 34B) of the frame members 33 (33F and 33B) and the upper end surfaces 71 of the holding members 70 (70L and 70R) have substantially the same height at the front and rear. On the other hand, the lower end surface 72 of the holding member 70 (70L or 70R) is an inclined surface that is inclined rearward and upward from the front to the rear so as to follow the floor panel 9, and the fastening points P3 and P4 between the lower end surfaces 72 of the holding members 70 (70L and 70R) and the floor panel 9 are configured such that the front fastening point P3 is located low and the rear fastening point P4 is located high. That is, the inclination of the floor panel 9 is adjusted by the holding members 70 (70L and 70R), and the power equipment unit 20 is held in parallel.

Figure 4:
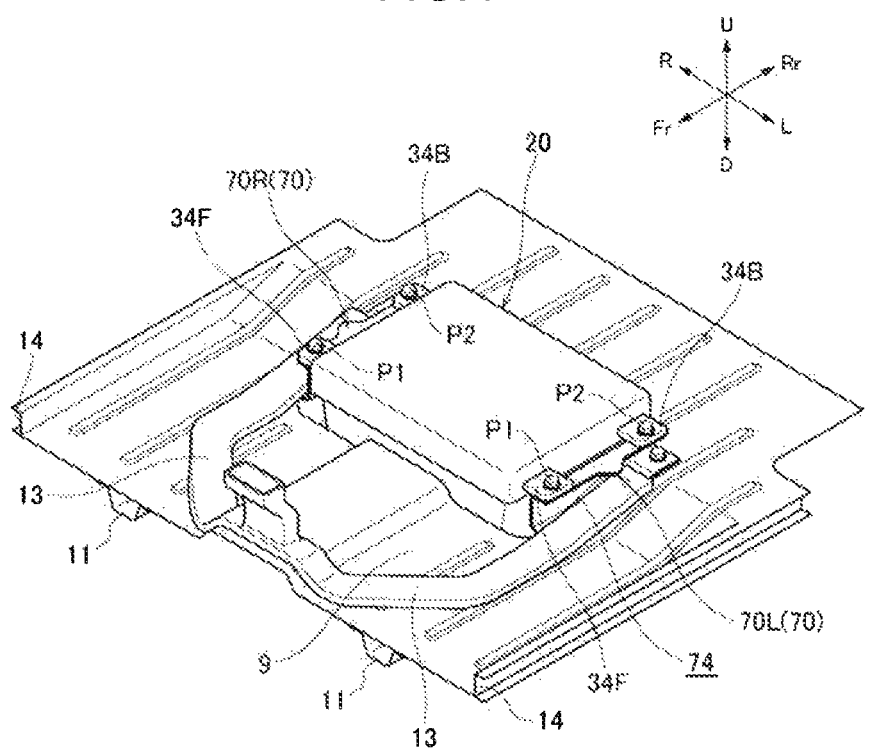
FIG. 4 is a perspective view illustrating a state in which a heater duct is added in FIG. 3.

As illustrated in FIGS. 4 to 6, on the floor panel 9, left and right heater ducts 13 are disposed to creep on the floor panel 9, thereby discharging warm air, which is sent from an air conditioner, toward a foot space of the middle seat 6 from a discharge port 13B at the rear end. The left and right heater ducts 13 have a wide flat shape in order to suppress a height dimension while ensuring a necessary cross-sectional area of channel, and are disposed in a U-shaped space 74 which is defined by the upper end surfaces 71, the lower end surfaces 72, and the vertical walls 73 of the holding members 70 (70L and 70R).

That is, the left heater duct 13 is disposed in the U-shaped space 74 of the left holding member 70L in a state where at least a part of the upper surface of the left heater duet 13 is covered by the upper end surface 71 of the left holding member 70L, and the right heater duet 13 is disposed in the U-shaped space 74 of the right holding member 70R in a state where at least a part of the upper surface of the right heater duct 13 is covered by the upper end surface 71 of the right holding member 70R.

As described above, according to the vehicle 1 of the present embodiment, since the frame member 33 is configured to suspend and hold the power equipment unit 20 in the recessed power equipment unit containing portion 10 and is fixed to the floor panel 9 through the holding member 70, it is possible to maintain the upper part of the power equipment unit 20 at a position higher than the floor surface, and to also maintain a waterproof line at a high position while achieving low-flooring.

Further, since the frame member 33 is fixed to the floor panel 9 through the holding member 70, the holding member 70 can absorb deformation of the side sill 14 and the floor frame 11 at the time of a side collision. Moreover, the power equipment unit 20 can also be protected by the vertical wall 73 of the holding member 70.

Further, since the holding member 70 has substantially the U-shaped cross section, the holding member 70 can be easily manufactured by press forming.

In addition, the holding member 70 can protect the heater duct 13 in the U-shaped space 74 while holding the power equipment unit 20. That is, since the upper end surface 71 of the holding member 70 covers the upper side of the heater duct 13, it is possible to alleviate the impact in the vertical direction of the heater duct 13 and to also alleviate noise from the heater duct 13. In particular, it is possible to prevent the worker from erroneously treading the heater duct 13 at the time of assembling the heater duct 13.

Further, since the vertical wall 73 of the holding member 70 is interposed between the power equipment unit 20 and the heater duct 13, a heat insulating effect can be expected between the power equipment unit 20 and the heater duct 13.

Further, when the floor panel 9 is inclined, the shape of the lower end surface 72 of the holding member 70 is adjusted according to the inclination of the floor panel 9, and thus the inclination of the floor surface can be adjusted by the holding member 70, whereby the power equipment unit 20 can be held in parallel even when the floor surface is inclined.

In addition, since the fastening points P1 and P2 between the upper end surface 71 of the holding member 70 and the frame member 33 are located inward in the vehicle width direction from the fastening points P3 and P4 between the lower end surface 72 of the holding member 70 and the floor panel 9, the length in the vehicle width direction can be lengthened by the holding member 70. Accordingly, the length of the frame member 33 can be shortened, and thus the power equipment unit 20 can be more firmly held by the frame member 33 and the holding member 70.

Further, since the fastening points P3 and P4 between the lower end surface 72 of the holding member 70 and the floor panel 9 are disposed at overlapping positions in a plan view with the floor frames 11 extending in the front and rear direction on the inner side in the vehicle width direction of the side sill 14, the power equipment unit 20 can be held more firmly.

Further, the power equipment unit 20 is installed under the front seat 5, and thus a space for the occupant can be widely provided in the passenger compartment, Incidentally, the present invention is not limited to the above-described embodiment, but can be changed or improved properly.

For example, in the above-described embodiment, the power equipment unit containing portion 10 housing the power equipment unit 20 is provided below the from seat 5. However, the power equipment unit containing portion 10 may be provided below the middle seat 6 or below the rear seat 7 as well as below the front seat 5.

In addition, the battery 50 is exemplarily illustrated as a power equipment. However, the power equipment is not limited to the battery, and may be an inverter, a DC/DC converter, and the like. In the power equipment unit, these components may be accommodated singly or in a combined form in a case.

In addition, the hybrid vehicle is exemplarily illustrated as the vehicle 1, However, the vehicle 1 is not limited thereto, and may be an electric vehicle, a fuel battery vehicle, and the like.

DESCRIPTION OF REFERENCE NUMERALS AND CHARACTERS 1 vehicle
5 front seat (seat)
9 floor panel
10 power equipment unit containing portion
11 floor frame (skeleton member)
13 heater duct (air-conditioning duct)
20 power equipment unit (power equipment)
33 frame member
70 holding member
71 upper end surface
72 lower end surface
73 vertical wall
74 U-shaped space
P1 fastening point (fastening point between upper end surface of holding member and frame member)
P2 fastening point (fastening point between upper end surface of holding member and frame member)
P3 fastening point (fastening point between lower end surface of holding member and floor panel)
P4 fastening point (fastening point between lower end surface of holding member and floor panel)

The invention claimed is:

1. A vehicle comprising:
a power equipment;
a floor panel having a recessed power equipment containing portion that houses the power equipment; and
a frame member that suspends and holds the power equipment, wherein
the frame member is fixed to the floor panel through a holding member so that a part of the power equipment protrudes from the floor panel,
the holding member has an upper end surface, a lower end surface, and a vertical wall that connects the upper end surface and the lower end surface to each other,
the frame member is fastened to the upper end surface of the holding member, and
the floor panel is fastened to the lower end surface of the holding member.

2. The vehicle according to claim 1, wherein
the holding member has substantially a U-shaped cross section that opens outward in a vehicle width direction.

3. The vehicle according to claim 2, wherein
an air-conditioning duct is disposed in a U-shaped space of the holding member.

4. The vehicle according to claim 3, wherein
the lower end surface of the holding member extends along the floor panel, and
the upper end surface of the holding member extends substantially horizontally.

5. The vehicle according to claim 1, wherein
a fastening point between the upper end surface of the holding member and the frame member is disposed inward in a vehicle width direction from a fastening point between the lower end surface of the holding member and the floor panel.

6. The vehicle according to claim 1, wherein
a fastening point between the lower end surface of the holding member and the floor panel is disposed at an overlapping position in a plan view with a floor frame extending in a front and rear direction on an inner side in a vehicle width direction of a side sill.

7. The vehicle according to claim 1, wherein
the power equipment containing portion is provided below a seat.

* * * * *